Nov. 16, 1965  A. C. A. HEISE  3,218,449
SUPPLEMENTAL ARTIFICIAL ILLUMINATION SAFETY APPARATUS
Filed Jan. 31, 1963  3 Sheets-Sheet 1

INVENTOR
ARTHUR C. A. HEISE

BY Jacobi & Davidson
ATTORNEYS

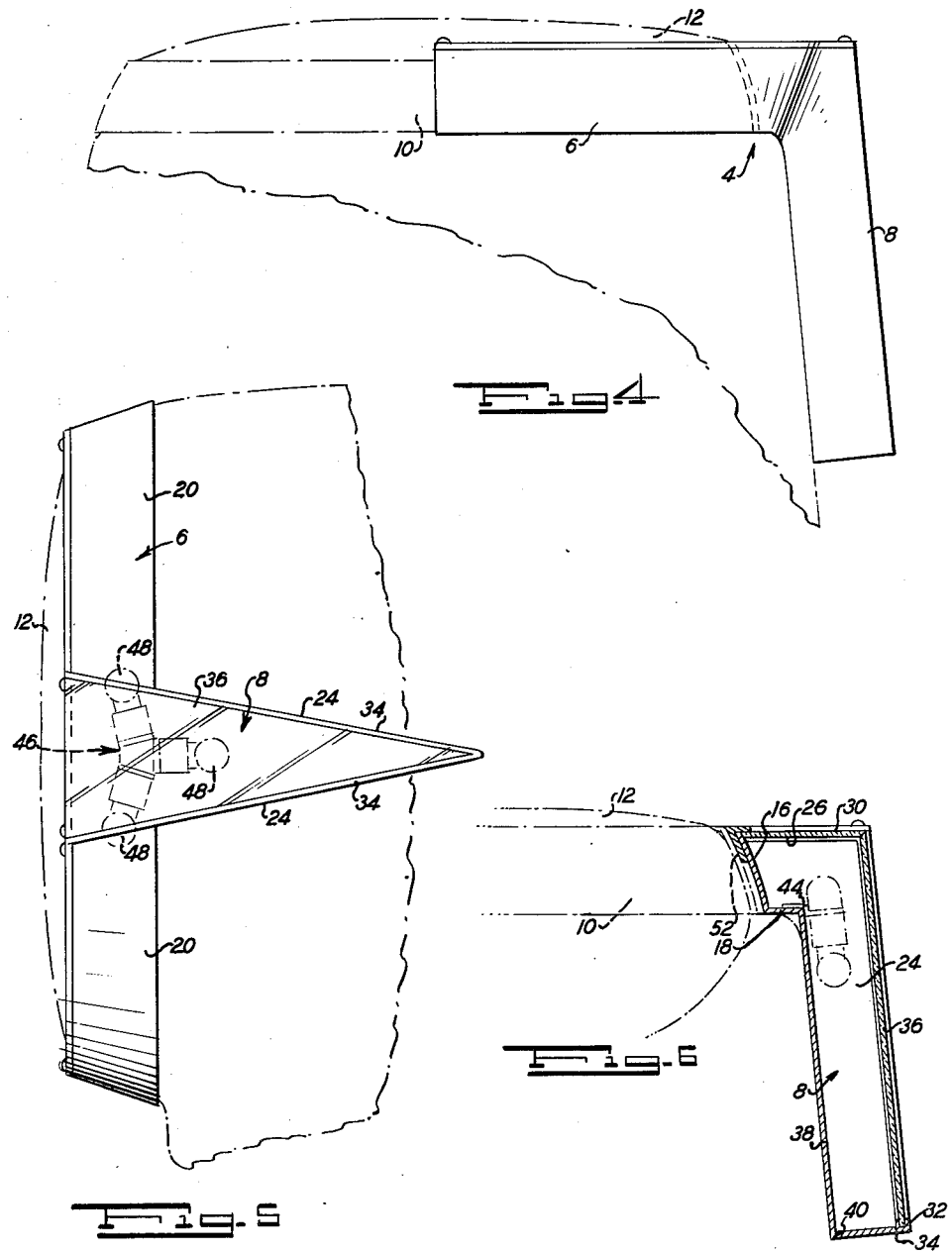

Nov. 16, 1965  A. C. A. HEISE  3,218,449
SUPPLEMENTAL ARTIFICIAL ILLUMINATION SAFETY APPARATUS
Filed Jan. 31, 1963  3 Sheets-Sheet 3

INVENTOR
ARTHUR C. A. HEISE

BY  Jacobi & Davidson
ATTORNEYS 3,218,449

SUPPLEMENTAL ARTIFICIAL ILLUMINATION SAFETY APPARATUS

Arthur C. A. Heise, 268 Arundel Road, Riviera Beach, Md.

Filed Jan. 31, 1963, Ser. No. 255,337
1 Claim. (Cl. 240—8.2)

The present invention relates generally to automobile headlights. More specifically, this invention is directed to a supplemental artificial illumination safety apparatus that is particularly adapted to be structurally operatively associated with the artificial illumination apparatus, that is, the headlights of contemporary automotive vehicles whereby to effectively reduce accidents when operating such vehicles in the absence of natural illumination, such as at night.

Contemporary automotive vehicles include apparatus for artificial illumination when operating such vehicles in the absence of natural illumination. Such apparatus, however, while effective to artificially illuminate the path of travel preceding a moving vehicle, is inherently defective in that it produces glare.

As a result, the operators of a plurality of such vehicles approaching one another from opposing directions have great difficulty in determining the dimensional extremities thereof. The consequence is a large number of accidents between vehicles occurring in the absence of natural illumination.

Though the prior art has recognized and attempted to solve this problem, such apparatus as are presently known are inherently defective in that they fail to enable operators of automotive vehicles approaching one another from opposing directions to accurately determine the dimensional extremities of their vehicles.

Although one of the primary objects of the present invention is to provide a supplemental artificially illuminating safety apparatus for reducing glare caused by artificial illumination apparatus of contemporary automotive vehicles, it is to be understood that another primary object of this invention is to provide a supplemental artificially illuminating safety apparatus structurally operatively associated with the headlights of contemporary automotive vehicles whereby to enable the operators thereof to accurately determine the dimensional extremities of their vehicles and thus effectively reduce accidents when conditions of little, if any, natural illumination prevail.

A further primary object of the present invention is to provide a supplemental artificially illuminating safety apparatus structurally operatively associated with the artificially illuminating apparatus of contemporary automotive vehicles and positioned upon and about a plurality of angularly disposed surfaces thereof, whereby the operators of a plurality of such vehicles approaching one another from opposing directions are enabled to accurately determine the dimensional extremities thereof thus effectively reducing accidents when conditions of little, if any, natural illumination prevail.

In addition to the general primary objects set forth supra, the present invention has further, more specific primary objects, namely, (a) the provision of a safety device structurally operatively associated with the artificial illumination apparatus, such as the headlights, of contemporary automotive vehicles for providing readily visible supplemental artificial illumination during periods of inclement weather such as rain, fog, snow, and the like, in which vision is oft obscured and the effective illumination provided by the headlights is greatly mitigated; (b) the provision of a supplemental artificially illuminating safety apparatus that is effective as a guide in parking contemporary automotive vehicles; (c) the provision of a supplemental artificially illuminating safety apparatus having minimal electrical energy requirements; and (d) the provision of a supplemental artificially illuminating safety device particularly adapted to be structurally operatively associated with the artificial illumination apparatus of contemporary automotive vehicles which is simple and yet unusually attractive in design, economical of fabrication and efficient in operation.

The invention lies in the construction, arrangement, and combination of the various assemblies, parts, and components of the supplemental artificially illuminating safety apparatus which forms the preferred embodiment of the present invention and which is described in detail hereinbelow. The description refers to the illustrative embodiment of the invention presented in the annexed drawings, wherein:

FIG. 4 is a plan view of the present invention illustrating the same in position with respect to a contemporary automotive vehicle, the latter being partially shown in phantom;

FIG. 5 is a side elevational view of the present invention illustrating the same in position with respect to a contemporary automotive vehicle, the latter being partially shown in phantom;

FIG. 6 is a cross-sectional detailed view of the present invention taken along the line 6—6 of FIG. 2 and illustrating the same in position with respect to a contemporary automotive vehicle, the latter being partially shown in phantom;

Figures 1, 3:
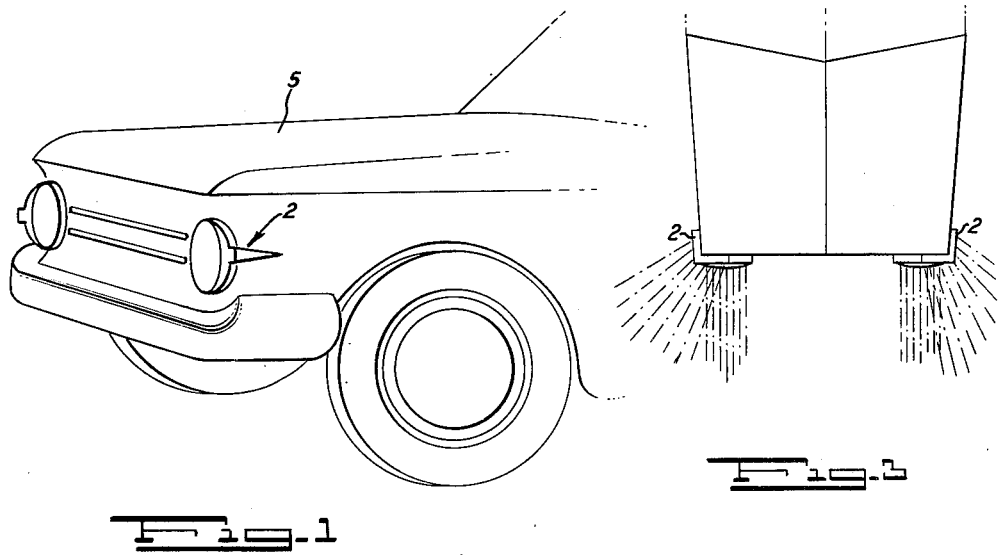
FIG. 1 is a partial perspective view of a contemporary automotive vehicle having supplemental artificial illumination safety apparatus in accordance with the present invention structurally operatively associated with each of the artificial illumination devices thereof.
FIG. 3 is a partial plan view of a contemporary automotive vehicle schematically indicating the area illuminated by the supplemental artificial illumination safety apparatus of the present invention as well as the area illuminated by conventional artificial illumination devices.
Figure 2:
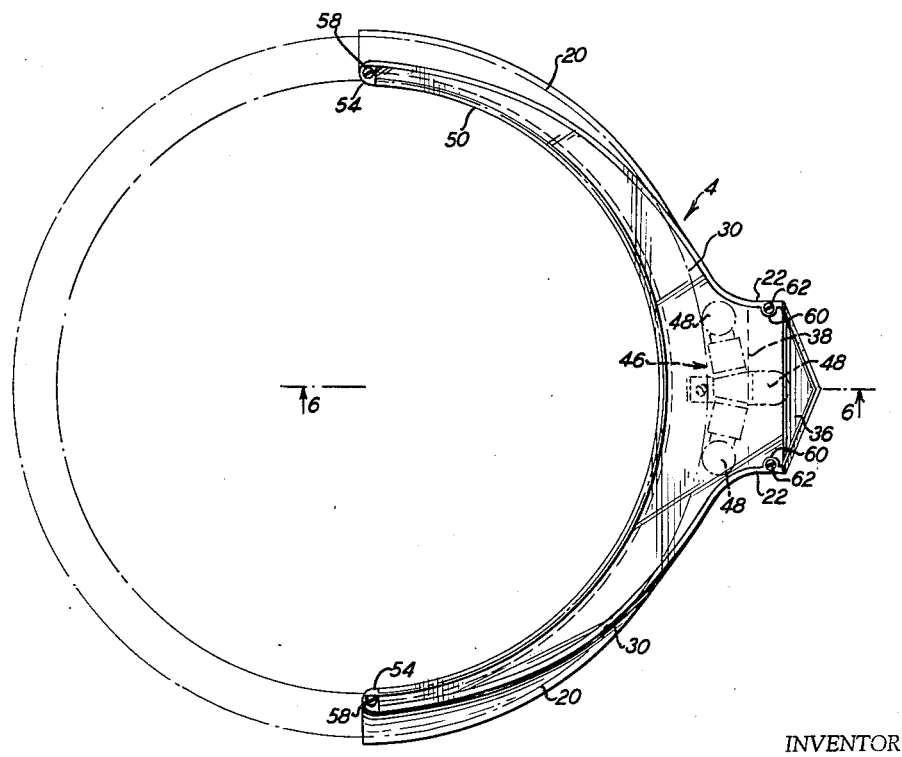
FIG. 2 is a front elevational view of the present invention illustrating the means for providing supplemental artificial illumination in phantom.

The supplemental artificial illumination safety apparatus of the present invention, as suggested, is shown in FIG. 1 as being structurally associated with each of the conventional artificial illumination devices of a contemporary automotive vehicle, and such apparatus is generally designated by the numeral 2. The apparatus 2 comprises an enclosure means or housing 4, said housing 4 being comprised of, in turn, a first portion 6 and a second portion 8, said first and second portions being angularly disposed with respect to one another whereby said housing 4 may be positioned upon and about a plurality of angularly disposed surfaces of a vehicle 5.

The first portion 6 is of generally semi-circular configuration whereby the same is adapted to be positioned upon and about the rim 10 of a conventional artificial illumination device 12. Thus, the first portion 6 comprises a positioning member having a curved portion 16 shaped to conform to the external surface of said rim 10.

A second and planar portion 18 is integrally operatively associated with said curved portion 16 and is positioned at an angle with respect thereto.

A plurality of holding and retaining members 20 are integrally operatively associated with said planar portion 18, said members 20 being of similar configuration with respect to said curved portion 16 but spaced therefrom. Each of said members 20 has an upwardly extending portion 22 that is integrally operatively associated with holding and retaining members 24, as will be hereinafter described. Channels 26 are positioned along the leading edge 28 of each of the holding and retaining members 20, said channels being adapted to have a radiant energy transmitting element 30 positioned therewithin, as disclosed infra.

The second portion 8 of the housing 4 comprises a plurality of holding and retaining members 24, as indicated supra, said members being positioned at an angle with respect to one another whereby said second portion 8 is V-shaped, as seen particularly in FIG. 5. Channels 32 are positioned along the upper edge 34 of each of the members 24, said channels being adapted to have a second radiant energy transmitting means 36 positioned therewithin.

Each of said members 24 is integrally operatively associated with the upwardly extending portion 22 of the holding and retaining members 20. A generally triangularly shaped enclosure member 38 is positioned between and integrally operatively associated with each of the members 24, along the bottom 40 thereof. The leading edge 42 of said member 38 is integrally operatively associated with the upper edge 44 of said planar portion 18.

A radiant energy transmitting element 30 is positioned between the holding and retaining members 20 within the channels 26 thereof, as indicated supra, said element 30 being of similar configuration with respect to the frontal area enclosed by said members. The peripheral extremities of the element 30 are chamfered (not shown) to provide ease of manipulation during installation thereof.

A second radiant energy transmitting element 36 is positioned between the holding and retaining members 24 within the channels 32 thereof, as indicated supra, said element 36 being of similar configuration with respect to the area enclosed by said members. Here, also the peripheral extremities are chamfered (not shown) to provide ready installation thereof.

Each of the radiant energy transmitting elements 30 and 36 is fabricated of any suitable material. Preferably, an acrylic plastic molding powder such as Plexiglas is used though any other material having similar characteristics, such as optical clarity, weather resistance and dimensional stability will suffice. The elements 30 and 36 are preferably colored elements, though the same may, if desired, be colorless.

The first and second portions 6 and 8, respectively, are fabricated of any suitable material, and preferably of metal, it being understood that the material chosen must be capable of readily being rendered exteriorly attractive. The portions 6 and 8, and the components thereof are, as indicated supra, integrally operatively associated with one another, the same being accomplished in any suitable manner, as by soldering.

Positioned within the enclosure means or housing 4 is a source of radiant energy 46, the same being positioned therewithin in any convenient manner. The source 46 comprises a plurality of incandescent lamps 48, a plurality of which are positioned to extend downwardly and between the positioning member 14 and the radiant energy transmitting member 30. The remainder of the lamps 48 are positioned between the enclosure member 38 and the radiant energy transmitting element 36. Thus, the radiant energy means 46 is so constituted and positioned as to provide radiant energy in a plurality of angularly disposed directions.

In assembling the apparatus 2 in accordance with the present invention, the radiant energy transmitting element 36 is first positioned between the holding and retaining members 24 and within the channels 32 thereof. Thereafter, the radiant energy transmitting element 36 is positioned between the holding and retaining elements 20 and within the channels 26 thereof. A V-shaped semicircularly configured retention element 50 is positioned upon and about the lower edge 52 of the positioning member 14, one leg thereof extending in front of the radiant energy transmitting element 30 and the other leg thereof extending behind the said edge 52. One leg of the element 50, and preferably the leg positioned behind the edge 52, is longitudinally dimensionally greater than the other leg whereby the same may be turned back upon itself at each end thereof to provide tabs 54. Each of the tabs 54 has perforations therewithin to cooperate with aligned perforations (not shown) in each of the holding and retaining members 20 and in the positioning member 14, whereby the retention element 50 may be securely positioned with respect thereto as by screws 58. If desired, the members 20 may be provided with tabs 60 having perforations therewithin alignable with perforations (not shown) in the radiant energy transmitting element 30 whereby screws 62 or the like may further securely position the transmitting element 30 in place.

Figure 7:
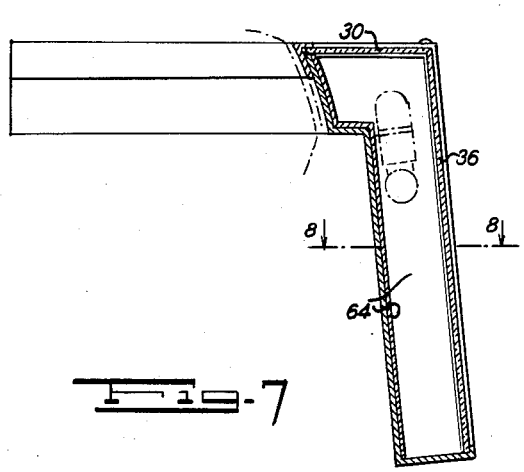
FIG. 7 is a view similar to FIG. 6 but illustrating a modification thereof.
Figure 8:
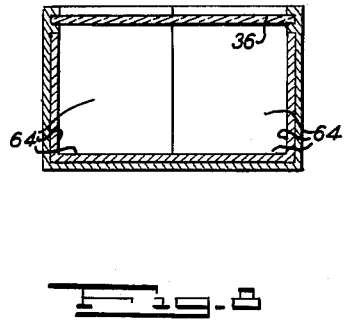
FIG. 8 is a cross-sectional detailed view of the modification illustrated in FIG. 7, taken along the line 7—7 thereof, and rotated through a 90-degree angle in a counterclockwise direction.

The first and second portions 6 and 8, respectively, of the enclosure means or housing 4 and the components thereof should be coated, in any suitable manner, with a material having the property of reflecting radiant energy. Thus, the components of the housing 4 could be silverplated. In some instances, it may not be desirable to coat the housing 4 and, in such instances, the portion 8 of the housing is provided with a separate reflecting means such as the channel-shaped separate filler 64, as clearly illustrated in FIGS. 7 and 8. The filler 64 is silver-plated or otherwise suitably provided with radiant energy reflecting properties.

Figure 9:
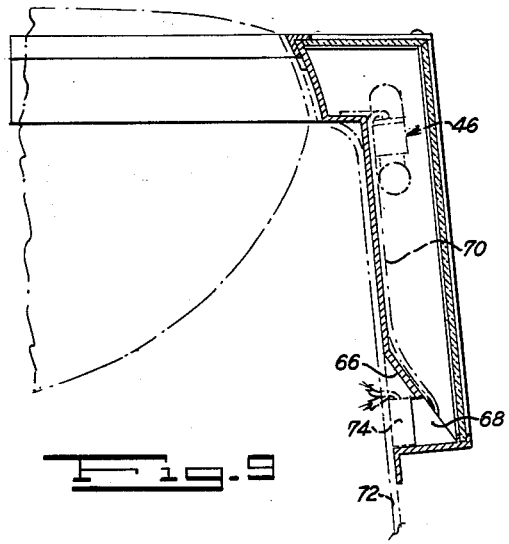
FIG. 9 is a view similar to FIG. 6 illustrating the means whereby the present invention is connected into the electrical system of the automotive vehicle with which it is structurally associated.
Figure 10:
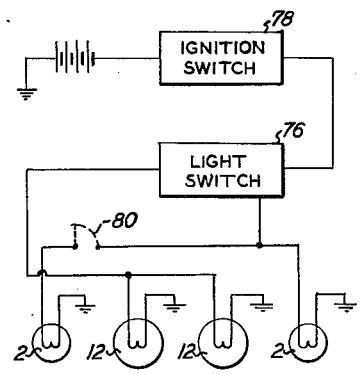
FIG. 10 is a schematic diagram of a preferred electrical circuit.

Referring now to FIGS. 9 and 10, a preferred form of connecting the apparatus 2 of the present invention to the electrical system of a contemporary automotive vehicle is illustrated therein. Thus the enclosure member 38 has an angularly offset portion 66, to which is structurally operatively associated a conventional plug 68. The plug 68 is connected to the source of radiant energy 46 is any suitable manner, as indicated at 70. Structurally operatively associated with the fender 72 of the vehicle 5 is a conventional socket 74. As illustrated in FIG. 10, the apparatus 2 of the present invention is connected to a conventional light switch 76, the latter preferably being in series with a conventional ignition switch 78 whereby the former can be energized only upon placing the latter in an "on" position. The light switch 76 is so constituted and arranged that the apparatus 2 is energized simultaneously with the conventional artificial illumination devices 12. If desired, a separate switch 80 may be provided to control the apparatus 2 independently of the switch 76.

There is provided, therefore, a supplemental artificial illumination safety device 2 that will reduce the glare caused by conventional artificial illumination devices, such as the device 12. Though it is not completely understood why the apparatus 2 of the present invention does effectively reduce glare, it is believed to be attributed to the fact that a plurality of different sources of radiant energy emit waves, some of which reach their subject in phase and some of which reach their subject out of phase. If the waves of radiant energy are in phase, they reinforce one another and thus produce bright spots. However, if some of the waves of radiant energy are out of phase, such waves tend to annul one another and thus produce dark spots. This, apparently, is the reason for the apparatus 2 effectively reducing glare.

In addition, the apparatus 2 of the present invention provides artificial illumination in a plurality of angularly disposed directions, as indicated in FIG. 3. Thus, the operators of vehicles approaching one another from opposing directions are able to accurately determine the dimensional extremities of their vehicles. They are, therefore, better enabled to judge distances, which, when taken in conjunction with the effective reduction of glare, as pointed out supra, reduces accidents between moving vehicles when operated in the absence of natural illumination.

In conclusion, it should be noted that the invention does enable a driver to look directly at oncoming bright headlights without any difficulty. Also, the apparatus continues to operate as a safety factor should the left front headlight be out.

After reading the foregoing detailed description of the preferred and illustrative apparatus incorporating the various embodiments of my invention, it will be understood that the objects set forth at the outset of this specification have been successfully achieved.

What is claimed is:

A supplemental illumination device adapted to be used on an automotive vehicle in conjunction with conventional headlights mounted in the fenders of the vehicle, said supplemental illumination device comprising:

enclosure means including a first portion and a second portion;

said first portion having a substantially semi-circular configuration and extending around the outer half of said conventional headlight rim;

said first portion having a rearward wall extending outwardly from said headlight rim to substantially the side of said vehicle fender;

said first portion also having a forward wall spaced ahead of said rearward wall and extending laterally from said headlight rim for a distance beyond the side of said vehicle fender;

said first portion forward wall being formed of colored light transmitting material which permits light to be transmitted therethrough;

a first light means disposed behind said first portion forward wall and being energizable to transmit illumination through said first portion forward wall, such illumination supplementing that of said headlights, yet being free from glare due to the light modifying action of said colored light transmitting material;

said second portion having a generally V-shaped configuration and extending along the side of said vehicle fender;

said second portion including an inside wall juxtaposed to said vehicle fender and tapering from a front edge to a rear point, thus forming a generally V-shaped surface;

said inside wall front edge being joined to the outer edge of said first portion rearward wall with such walls subtending therebetween, an obtuse angle slightly greater than ninety degrees;

said second portion also having upper and lower walls converging toward one another rearwardly from said headlight and merging together in alignment with said rear point of said inside wall;

said second portion further having an outside wall in outwardly spaced parallel disposition to said inside wall and disposed between said upper and lower walls with said outside wall being formed of colored light transmitting material which permits light to be transmitted therethrough;

a second light means disposed between said inside and outside walls and being energizable to transmit illumination through said outside wall, such illumination serving to indicate the dimensional extremities of the vehicle, yet being free from glare due to the light modifying action of said colored light transmitting material; and, said second portion inside wall being at least partially coated by a reflective material which reflects light from said second light means radially outwardly through said outside wall.

References Cited by the Examiner

UNITED STATES PATENTS

| 1,145,087 | 7/1915 | Shaw | 240—8.1 |
| 1,655,571 | 1/1928 | Sims | 240—8.2 |
| 1,814,669 | 7/1931 | Cushing | 240—8.22 |
| 2,543,226 | 2/1951 | Briggs | 240—8.1 |
| 3,110,883 | 11/1963 | Nallinger et al. | 240—8.1 X |

FOREIGN PATENTS

| 853,712 | 11/1960 | Great Britain. |

NORTON ANSHER, *Primary Examiner.*